H. CARROLL.
NON-SKID DEVICE.
APPLICATION FILED APR. 11, 1916.

1,236,671.

Patented Aug. 14, 1917.

Witness
G. F. Turecek

Inventor
Holly Carroll
by Orwig & Barr
Attys

UNITED STATES PATENT OFFICE.

HOLLEY CARROLL, OF BOONE, IOWA.

NON-SKID DEVICE.

1,236,671. Specification of Letters Patent. Patented Aug. 14, 1917.

Application filed April 11, 1916. Serial No. 90,505.

*To all whom it may concern:*

Be it known that I, HOLLEY CARROLL, a citizen of the United States, and resident of Boone, in the county of Boone and State of Iowa, have invented a certain new and useful Non-Skid Device, of which the following is a specification.

The object of my invention is to provide a non-skid device for pneumatic or other tires, of simple, durable and inexpensive construction.

A further object is to provide such a device which can be quickly and easily installed on or removed from a wheel.

Still a further object is to provide such a device having a minimum of material and comprising a ring of smaller diameter than the wheel, formed of two parts hinged together, and having means for fastening the free ends together, the ring being provided with pairs of oppositely extending fastening devices for holding the chains extended over the tire.

My invention consists in the construction, arrangement and combination of the various parts of the device, whereby the objects contemplated are attained as hereinafter more fully set forth, pointed out in my claim, and illustrated in the accompanying drawings, in which:

Figure 1:
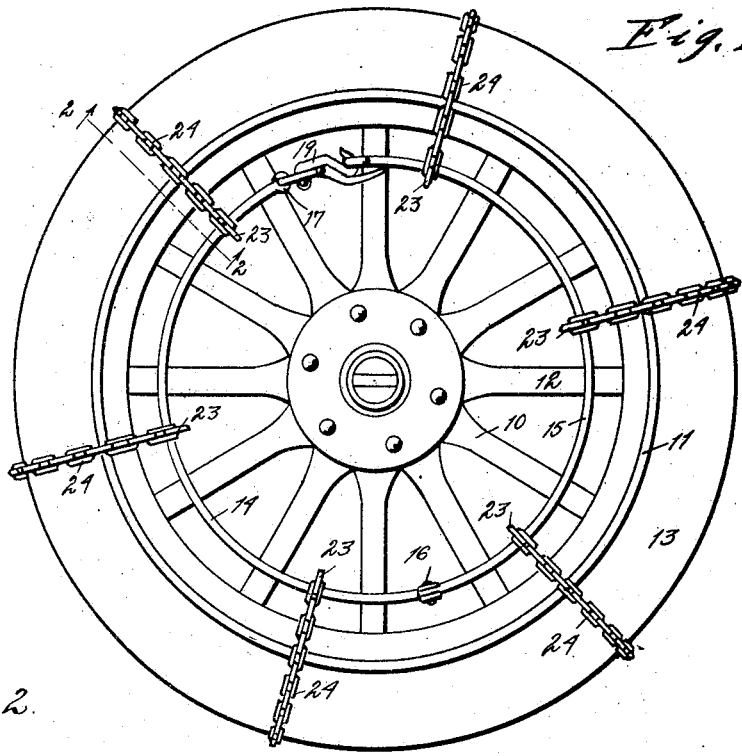
Figure 1 shows a side elevation of a wheel equipped with a pneumatic tire having installed thereon a non-skid device embodying my invention.

In the accompanying drawings, I have used the reference numeral 10 to indicate generally a wheel having a rim 11, spokes 12 and a pneumatic tire 13.

In the form of my invention illustrated in the accompanying drawings, the numerals 14 and 15 indicate the two parts of a ring made of a resilient rod or the like. The rod members 14 and 15 are suitably hinged together at 16, and are provided at their free ends with rings 17 and 18. A suitable hook or locking device 19 is provided for securing the free ends of the ring members together. The ring members 14 and 15 are provided at regular intervals with pairs of oppositely extending fastening or engaging devices. The ring members are adapted to be placed adjacent to the spokes of a wheel and are of less total diameter than the rim.

One engaging device of each pair comprises a shank 20 extending laterally from the ring member, and having at its end a hook 21 arranged to coact with a spring snap 22. The other engaging device of each pair comprises a hook 23.

I provide a plurality of short chains 24 made of comparatively short links, each having one link secured to the hook 21, and having the other link secured to the hook 23 on the opposite pair of fastening devices.

Figure 2:
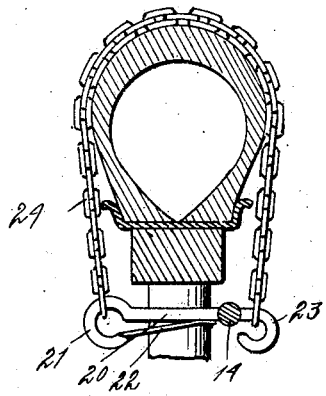
Fig. 2 shows a detail sectional view taken on the line 2—2 of Fig. 1.
Figure 4:
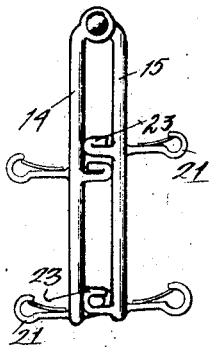
Fig. 4 shows a detail view of the ring in its collapsed position.

In installing the device on a wheel, the ring is placed in position adjacent to the spokes on one side of the wheel and radially inwardly from the rim with the shanks 20 extended across the wheel between the spokes, as shown in Figs. 1 and 2. Two or three chains 24 are then assembled by placing their central portions around the tire from side to side and hooking their respective ends to the respective adjacent hooks 21 and 23 on opposite sides of the tire. After three chains, for instance, have been assembled in succession around the tire, then another chain is installed on a pair of hooks diametrically opposite to one of the first installed chains, by first hooking one end of the chain over a hook 23, and then passing the chain around the tire and hooking the appropriate link thereof on the proper snap hook 21.

Figure 3:
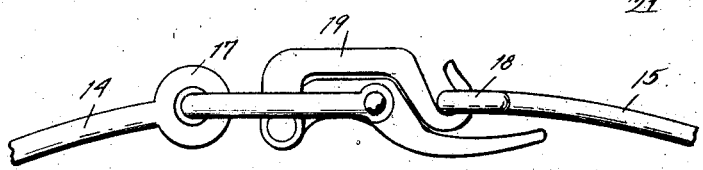
Fig. 3 shows an enlarged detail view of the means for connecting the free ends of the ring.

It will be understood that in the installation of the last mentioned chain, the chain may be pulled against the hook 23 hard enough to tighten the first assembled chain, and spring the ring slightly before the last chain is passed around the tire, and the parts are held in this position while the hook 21 is pulled radially outwardly as far as possible, and hooked in a link of the chain so as to make the last assembled chain tight on the tire. The pull on the hook 23 together with the pull on the chain will spring the chain sufficiently, so that its resiliency will hold the chains snugly on the tire. The remaining chains are then assembled in the same manner as that just described. With the tightening and locking device shown in Fig. 3, the ring and the chains 24 can be installed on the tire, with the ring in slightly expanded position, and when the chains are all in position, the ring can be contracted for thereby further insuring the snug fitting of the chains.

The resilience of the ring will hold all the chains snugly when they have been installed. Adjustment can be made for holding the chain snugly in position at all times, and for adjusting the non-skid device to tires of different sizes by selectively connecting different links to the hooks 23, as will be seen from the foregoing description, the entire non-skid device employs a minimum of material and can be manufactured at a very small expense, and there are no complicated parts.

The device can be quickly and easily installed on the wheel or removed therefrom without the use of any special tools and can be adjusted to fit different wheels to hold the chain snugly at all times.

Some changes may be made in the construction and arrangement of the parts of my non-skid device without departing from the essential features and purposes thereof, and it is my intention to cover by this application any such changes which may be included within the scope of my claim.

I claim as my invention:

In a non-skid device, a resilient ring, a plurality of transverse bars fixed thereto, one end of the bars being of greater length than the other, a hook fixed to each end of the bars, and a plurality of chains adapted to have one end secured to the hooks on the shorter ends of said bars, and one of the links adjacent to the other end secured to the hooks on the longer end of the bars.

Des Moines, Iowa, April 4, 1916.

HOLLEY CARROLL.